United States Patent [19]

Kawamura et al.

[11] Patent Number: 4,717,556

[45] Date of Patent: Jan. 5, 1988

[54] METHOD FOR PRODUCING OF β-TRICALCIUM PHOSPHATE

[75] Inventors: Sukezo Kawamura, Inuyama; Motohiro Toriyama, Nagoya, both of Japan

[73] Assignees: Agency of Industrial Science & Technology; Ministry of International Trade & Industry, both of Tokyo, Japan

[21] Appl. No.: 916,746

[22] Filed: Oct. 8, 1986

[30] Foreign Application Priority Data

Oct. 11, 1985 [JP] Japan .................................. 60-227545

[51] Int. Cl.$^4$ ............................................. C01B 15/16
[52] U.S. Cl. ................................... 423/311; 423/305; 423/308; 423/309

[58] Field of Search ................. 423/311, 305, 308, 309

[56] References Cited

FOREIGN PATENT DOCUMENTS 1455360 11/1976 United Kingdom ................. 423/311

Primary Examiner—Gregory A. Heller
Attorney, Agent, or Firm—Oblon, Fisher, Spivak, McClelland, & Maier

[57] ABSTRACT

A microfine β-tricalcium phosphate powder is produced by mixing hydrogen calcium phosphate powder, calcium carbonate powder, and water in amounts calculated to give a slurry having a solids concentration in the range of 5 to 15% by weight and a CA:P atomic ratio in the range of 1:1.4~1.6 and subjecting the slurry to attrition.

8 Claims, 3 Drawing Figures

METHOD FOR PRODUCING OF β-TRICALCIUM PHOSPHATE

FIELD OF THE INVENTION AND RELATED ART STATEMENT

This invention relates to a method for the production of a microfine β-tricalcium phosphate powder. More particularly, this invention relates to a method for producing on a commercial scale by a wet process a microfine β-tricalcium phosphate suitable as a raw material for bioceramics such as artificial bones, artificial joints, and artificial tooth roots by using hydrogen calcium phosphate or the dihydrate thereof in the form of powder and calcium carbonate in the form of powder as raw materials.

In recent years, research on artifical bones, artificial joints, and artificial tooth roots to be used for replacing or repairing their natural counterparts damaged as in traffic accidents or lost owing to bone tumor, arthritis deformans, and rheumatism has been gaining momentum. The raw material for such artificial bone is desired to lack toxicity, be safe to use, have high mechanical strength, join and vanish naturally within a living body so as to be replaced by newly formed natural bones. As prospective materials satisfying this requirement, sintered products of β-tricalcium phosphate and hydroxylapatite are attracting attention.

Since, β-tricalcium phosphate has relatively high solubility in living bodies, it is suitable as a raw material for replacing lost or damaged bones. Since hydroxylapatite has high strength and high resistance to corrosion, it is suitable as a raw material for artificial joints and artificial tooth roots.

This invention is directed to a method for the production of a microfine β-tricalcium phosphate powder.

As means of producing β-tricalcium phosphate ($Ca_3(PO_4)_2$) and hydroxylapatite, dry methods and wet methods are available. Wet methods are particularly simple in terms of process and, therefore, prove advantageous from a commercial point of view. By the wet methods, although hydroxylapatite can be generally produced easily, β-tricalcium phosphate cannot easily be produced in high purity.

As means of producing β-tricalcium phosphate by the wet process, a method which resorts to a neutralizing reaction between an aqueous slurry of calcium hydroxide and an aqueous phosphoric acid solution and a method which resorts to a reaction of an aqueous calcium nitrate solution with an aqueous hydrogen ammonium phosphate solution, for example, have been known to the art. The former method has, however, suffered the disadvantages that the reaction tends to form hydroxylapatite or a precursor thereof because the temperature of the reaction system is raised by the heat of reaction to a level of not less than 80° C., that the neutralizing reaction proceeds quickly so that the formed particles tend to occlude particles of unaltered raw materials in the nuclei thereof because calcium hydroxide is used not in the form of a solution but in the form of a slurry, and that particles having differing calcium/phosphorus atomic ratios are formed so that particles of a homogeneous composition are not obtained unless the pH of the reaction system is kept at a fixed level (6 to 7).

For this method to produce β-tricalcium phosphate of high purity, therefore, the reaction requires use of a reactor provided with a highly efficient stirrer and the reaction product requires aging for a long time.

In the latter method, the pH of the reaction system must be kept at a level exceeding 10 to ensure formation of a precipitate and, under such a pH condition, the reaction tends to form hydroxylapatite because of an inevitable elevation of the temperature of the reaction solution and the product acquires a heterogeneous composition because of inevitable formation of differing calcium/phosphorus atomic ratios unless the pH and the temperature of the reaction solution are kept constant.

For this method to produce β-tricalcium phosphate of high purity, therefore, the reaction requires use of a reactor provided with a cooling device and the reaction conditions must be controlled exactly.

The conventional wet process methods used for the production of β-tricalcium phosphate require exact control of the temperature and pH of the reaction solution to ensure high purity for their products as described above and, therefore, cannot be called commercially practicable methods. They also have the drawback of being expensive.

OBJECT AND SUMMARY OF THE INVENTION

An object of this invention is to provide a method for inexpensive commercial production of a homogeneous microfine β-tricalcium phosphate powder of high quality suitable as a raw material for bioceramic article such as artificial bones.

The inventors continued a study in search of a way of accomplishing the object described above and consequently found that the product aimed at can be obtained by preparing an aqueous slurry of required concentration using the powder of inexpensive hydrogen calcium phosphate or dihydrate thereof and the powder of calcium carbonate in a specific ratio, and subjecting the aqueous slurry to attrition and reaction. This invention has been perfected based on this finding.

To be specific, the present invention relates to a method for the production of β-tricalcium phosphate, which comprises mixing the powder of an anhydride or dihydride of hydrogen calcium phosphate, the powder of calcium carbonate, and water thereby producing an aqueous slurry having a calcium/phosphorus atomic ratio in the range of 1:1.4~1.6 and a solids content in the range of 5 to 15% by weight, subjecting the aqueous slurry to attritive force for a fixed length of time, and separating particles from the resulting reaction product.

DETAILED DESCRIPTION OF THE PREFERRED EMBODIMENT

Figure 1:
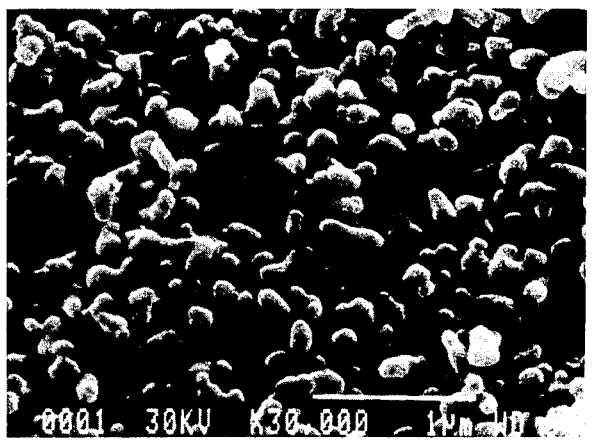
FIG. 1 shows a powder obtained by drying β-tricalcium phosphate produced by the method of this invention.

In the method of this invention, an aqueous slurry is prepared by using, as raw materials, the powder of hydrogen calcium phosphate or a dihydrate thereof, the powder of calcium carbonate in amounts such that the produced aqueous slurry will have a calcium/phosphorus atomic ratio in the range of 1:1.4 to 1:1.6, preferably about 1:1.5 and a solids concentration in the range of 5 to 15% by weight. If the concentration of the aqueous slurry is less than 5% by weight, it is too low for the attrition to proceed practically. If this concentration exceeds 15% by weight, the slurry is deficient in reactivity and the finally produced $\beta$-tricalcium phosphate is in the form of a granular powder entraining unaltered hydrogen calcium phosphate. When the concentration of the aqueous slurry is in the aforementioned range, the final reaction product is in the form of foliate hydrate particles of substantially wholly $\beta$-tricalcium phosphate.

The $\beta$-tricalcium phosphate is intended primarily for making artificial bones as described above. It is, therefore, crystallized by calcination and then sintered. In the case of the aforementioned granular particles, the particles which have undergone the calcination (at 750° C., for example) have a specific surface area of 24 $m^2/g$. The sintered mass produced from these calcinated particles exhibits bending strength in the range of 1,230 to 1,280 $kgf/cm^2$. In contrast, in the case of the foliate particles, the particles which have undergone the calcination have a specific surface area of 30 $m^2/g$, for example, and the sintered mass produced from this calcinated particles exhibits bending strength in the range of 1,350 to 1,460 $kgf/cm^2$. The product of this invention, thus, is superior to the conventional product.

Then, the aqueous slurry prepared as described above is subjected to attrition and reaction using a ball mill, a colloid mill, or a vibration mill preferably at a temperature in the range of 20° to 50° C. In this case, the reaction system requires absolutely no pH adjustment, unlike the conventional wet method. In consequence of the attrition, the hydrogen calcium phosphate and the calcium carbonate are gradually dissolved in water and the reaction between these components proceeds similar to a homogenous reaction, giving rise to microfine $\beta$-tricalcium phosphate hydrate particles of homogeneous composition. Although the reaction time varies with the reaction temperature, it is generally in the range of 5 to 50 hours.

If the reaction temperature does not reach the lower limit, 20° C., the reaction time is excessive. If it exceeds the upper limit, 50° C., the product suffers from unwanted inclusion of hydroxylapatite.

In the present wet method, $\beta$-tricalcium phosphate is believed to be formed through the following reaction path

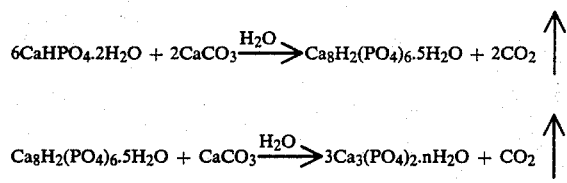

The compound, $Ca_8H_2(PO_4)_6.5H_2O$, appearing in the reaction formula is believed to be an intermediately formed metastable phase. Eventually, however, the reaction terminates with the formation of a hydrate of $\beta$-tricalcium phosphate.

After the reaction is carried out as described above, the solid reaction product is separated from the reaction system as by means of filtration and centrifugation and then dried at a temperature in the range of 40° to 200° C. to obtain a dry microfine $\beta$-tricalcium phosphate hydrate (identified by the X-ray diffraction method) powder of homogeneous composition. The solid reaction product obtained by the method of this invention is such that it is not transformed into hydroxylapatite or the precursor thereof even when it is dried at a temperature exceeding 80° C. In contrast, the reaction product obtained by the conventional wet method possesses an apatite structure and forms hydroxylapatite when it is dried by heating.

The dry powder of $\beta$-tricalcium phosphate obtained by the method of this invention has a specific surface area in the range of 70 to 100 $m^2/g$. When this powder is calcined at 750° C., for example, the resulting powder still has a very large specific surface area on the order of 30 $m^2/g$. This fact implies that the dry powder is a mass of aggregates of extremely minute particles.

The aforementioned dry powder is converted into an anhydride when it is treated at an elevated temperature in the range of 400° to 500° C. and further converted into clear crystals at 750° C. The crystals, as shown in FIG. 1, closely resemble spheres about 0.1 micron in diameter.

Ceramic articles of excellent strength are easily obtained by firing this dry powder at a temperature in the range of 800° to 1,350° C.

The method of this invention produces a microfine $\beta$-tricalcium phosphate powder of homogeneous composition by a simple procedure using, as raw materials therefor, the powder of hydrogen calcium phosphate or the dihydrate thereof and the powder of calcium carbonate. Thus, it has a very high economic value.

The sintered articles of the $\beta$-tricalcium phosphate which is obtained by the method of this invention exhibit highly desirable strength and, therefore, are suitable for use as bioceramics including artificial bones, artificial joints, and artificial tooth roots.

Now, the present invention will be described more specifically below with reference to working examples.

EXAMPLE 1

Hydrogen calcium phosphate dihydrate ($Ca_3HPO_4.2H_2O$) and calcium carbonate were mixed in amounts calculated to give a Ca/P atomic ratio of 1:1.5. By adding water to the resulting mixture there was prepared a slurry having a solids concentration of 15% by weight. In a ball mill, this slurry was left to undergo attrition for 24 hours. The product of attrition was removed from the ball mill and filtered to separate the solid particles. The solid particles were dried in an electric drier at 80° C.

The resulting dry powder was identified by thermal analysis and X-ray diffraction to be $\beta$-tricalcium phosphate hydrate. When this dry powder was calcined at 750° C., it was converted into crystals of $\beta$-tricalcium phosphate. The crystals had a specific surface area of 26.8 $m^2/g$ and consisted of extremely minute particles.

The aforementioned dry powder was molded and tested for the sintering property as follows. Molded test pieces were sintered at varying temperatures and the sintered test pieces were tested for density, water absorption ratio, and bending strength by way of evaluation of the sintering property. As the result, the practical sintering temperature was found to be 1,000° to 1,200° C., optimally 1,030° to 1,050° C. It was confirmed that the dry powder sinters very easily.

EXAMPLE 2

A dry powder was obtained by following the procedure of Example 1, except that the slurry concentration was changed to 10% by weight and the time of attrition in the ball mill was changed to 15 hours.

Figure 2:
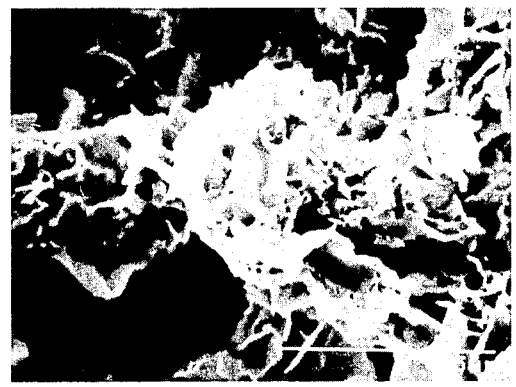
FIG. 2 is a scanning electron micrograph, at 10,000 magnifications, of foliate crystals of β-tricalcium phosphate hydride produced by the method of this invention as demonstrated in Example 2.

It was identified to be β-tricalcium phosphate hydrate. By observation under a scanning electron microscope, it was found to consist of foliate crystals having an average major diameter of 1 micron and a thickness of not more than 0.001 micron as illustrated in FIG. 2.

When this dry powder was calcinated at 750° C., the calcinated powder had a specific surface area of 27.4 m²/g. Sintered test pieces were produced from the sintered powder as described below and tested for bending strength.

Specifically, bar-shaped sintered test pieces 60 mm in length, 6 mm in width, and 3 mm in thickness were tested by the three-point bending method using a fulcrum interval of 30 mm and a crosshead speed of 0.5 mm/min. The bending strength was found to range from 1,350 to 1,460 kgf/cm².

COMPARATIVE EXPERIMENT 1

A dry powder was obtained by following the procedure of Example 1, except that the slurry concentration was changed to 20% by weight.

Figure 3:
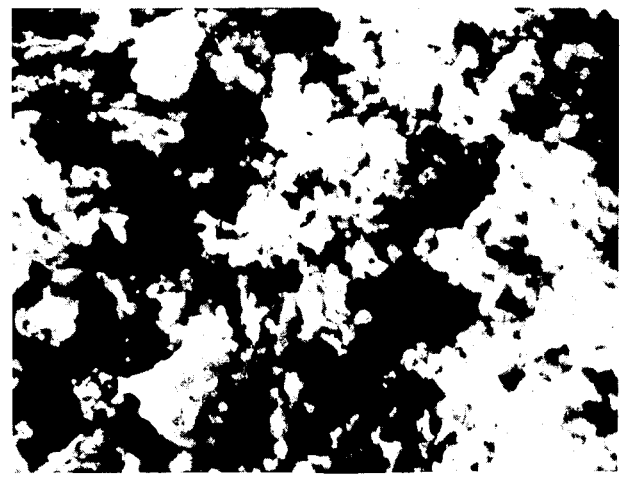
FIG. 3 is a scanning electron micrograph, at 10,000 magnifications, of a dry granular powder obtained in a comparative Experiment.

This dry powder, by thermal analysis and X-ray diffraction was found to contain unaltered hydrogen calcium phosphate. By observation under a scanning electron microscope, it was found to consist of granular particles as illustrated in FIG. 3. The granular particles had a size of about 0.5 micron.

When this dry powder was treated similarly to Example 1, the calcined powder obtained at 750° C. had a specific surface area of 24 m²/g. The sintered test pieces produced from the calcined powder were found to possess bending strength in the range of 1,230 to 1,280 kgf/cm².

COMPARATIVE EXPERIMENT 2

A dry powder was obtained by following the procedure of Example 1, except that the mixing ratio of hydrogen calcium phosphate dihydrate and calcium carbonate was changed to give a Ca/P atomic ratio of 1.68.

When this dry powder was calcined at 750° C., the calcined powder was found to consist wholly of hydroxylapatite crystals having a specific surface area of 29 m²/g.

What is claimed is:

1. A method for the production of microfine particulate β-tricalcium phosphate having a specific surface area within the range of 70 to 100 m²/g, which comprises:
    mixing calcium hydrogen phosphate powder, calcium carbonate powder, and water thereby preparing an aqueous slurry containing said compounds in a calcium/phosphorus atomic ratio in the range of 1:1.4~1.6 and having a solids concentration in the range of 5 to 15% by weight;
    subsequently subjecting said aqueous slurry to attrition for a period in the range of 5 to 50 hours; and
    separating particles of said β-tricalcium phosphate from the resulting product of attrition.
2. The method according to claim 1, wherein said attrition of said aqueous solution is effected by treating said aqueous slurry in a ball mill, a colloid mill, or a vibration mill.
3. The method according to claim 1, wherein said hydrogen calcium phosphate is at least one member selected from the group consisting of the anhydride and dihydrate forms of clacium hydrogen phosphate.
4. The method according to claim 1, wherein said aqueous slurry is subjected to said attrition at a temperature in the range of 20° to 50° C.
5. The method according to claim 1, which further comprises heating said particles separated from said product thereby converting said particles into crystalline particles.
6. The method according to claim 5, wherein said β-tricalcium phosphate powder is converted into said crystalline particles at a temperature of 750° C.
7. The method according to claim 1, wherein said separated product of attrition is dried by heating at a temperature ranging from 40° to 200° C.
8. A method for the production of microfine, particulate β-tricalcium phosphate having a specific surface area within the range of 70 to 100 m²/g, which comprises:
    mixing calcium hydrogen phosphate powder, calcium carbonate powder and water, thereby preparing an aqueous slurry containing said compounds in a calcium/phosphorous atomic ratio within the range of 1:1.4~1.6 and having a solids concentration in the range of 5 to 15% by weight;
    subsequently subjecting said aqueous slurry to attrition for a time period within the range of 5 to 50 hours at a temperature ranging from 20° to 50° C.; and
    separating particles of said β-tricalcium phosphate.

* * * * *